United States Patent
Schmitt

(10) Patent No.: US 12,364,934 B2
(45) Date of Patent: Jul. 22, 2025

(54) DEVICE AND METHOD FOR THE EXTRACTION OF ONE OR MORE COMPONENTS, IN PARTICULAR CANNABINOIDS SUCH AS TETRAHYDROCANNABINOL FROM A MIXTURE OF SUBSTANCES

(71) Applicant: BG BRAINGATE TECHNOLOGY GMBH, Cologne (DE)

(72) Inventor: Fritz Schmitt, Steinheim (LU)

(73) Assignee: BG BRAINGATE TECHNOLOGY GMBH, Cologne (DE)

( * ) Notice: Subject to any disclaimer, the term of this patent is extended or adjusted under 35 U.S.C. 154(b) by 0 days.

(21) Appl. No.: 17/762,957

(22) PCT Filed: Mar. 17, 2022

(86) PCT No.: PCT/DE2022/100206
§ 371 (c)(1),
(2) Date: Mar. 23, 2022

(87) PCT Pub. No.: WO2023/174464
PCT Pub. Date: Sep. 21, 2023

(65) Prior Publication Data
US 2025/0025809 A1    Jan. 23, 2025

(51) Int. Cl.
*B01D 11/02* (2006.01)

(52) U.S. Cl.
CPC ...... *B01D 11/0211* (2013.01); *B01D 11/0207* (2013.01); *B01D 11/0249* (2013.01); *B01D 11/0261* (2013.01); *B01D 11/0288* (2013.01)

(58) Field of Classification Search
CPC ............ B01D 11/0211; B01D 11/0249; B01D 11/0261
See application file for complete search history.

(56) References Cited

U.S. PATENT DOCUMENTS 9,709,582 B1 * 7/2017 Gordon ................ G01N 33/582
2003/0222017 A1  12/2003 Fulton et al.

FOREIGN PATENT DOCUMENTS

CN         205182220 U  *  4/2016
CN         105903226 A      8/2016
(Continued)

OTHER PUBLICATIONS

Jiang J. et al—CN 111199861B machine translation (Year: 2020).*
(Continued)

*Primary Examiner* — Bradley R Spies
(74) *Attorney, Agent, or Firm* — Harness, Dickey & Pierce, P.L.C.

(57) ABSTRACT

The invention relates to a device for extracting one or more constituents, in particular THC and/or cannabinoids, from a mixture of substances, the device having a chamber, a plate accommodated in the chamber, at least one nozzle for feeding the mixture of substances into the chamber and a static charging unit, wherein the static charging unit is arranged to statically charge the mixture of substances, wherein the plate has a charge opposite to the static charge of the mixture of substances, so that the statically charged mixture of substances, or at least components thereof, adheres or is adherable to the plate. The invention also relates to a corresponding method.

19 Claims, 3 Drawing Sheets

(56) References Cited

FOREIGN PATENT DOCUMENTS

Figure 1:
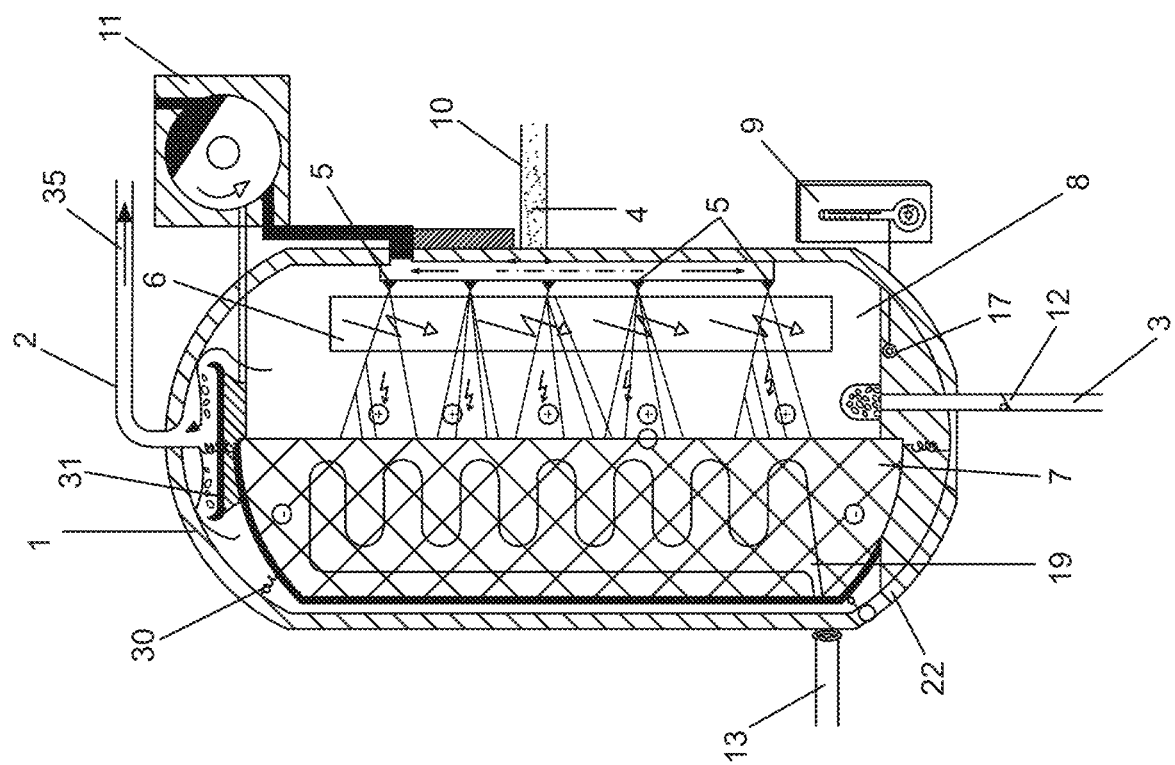

| CN | 111199861 B | * | 12/2020 | .......... H01J 49/0404 |
|----|-------------|---|---------|------------------------|
| EP | 0356030 A2 | | 2/1990 | |
| EP | 2871002 A1 | | 5/2015 | |
| GB | 1205562 A | | 9/1970 | |
| JP | 2011041908 A | | 3/2011 | |

OTHER PUBLICATIONS

Ye J et al—CN 205182220 U machine translation (Year: 2016).*
Wenrui Yang et al: "Several Effects of Electric Fields on Liquid Extraction", IEEE Transactions on Industry Applications, IEEE Service Center, Piscataway, NJ, US, vol. 26, No. 2, Mar. 1, 1990 (Mar. 1, 1990), pp. 366-373, XP000136711, ISSN: 0093-9994, DOI: 10.1109/28.54265.
German International Search Report and Written Opinion issued in PCT/DE2022/100206, mailed Nov. 29, 2022; ISA/EP.

* cited by examiner

DEVICE AND METHOD FOR THE EXTRACTION OF ONE OR MORE COMPONENTS, IN PARTICULAR CANNABINOIDS SUCH AS TETRAHYDROCANNABINOL FROM A MIXTURE OF SUBSTANCES

CROSS-REFERENCE TO RELATED APPLICATIONS

This application is a U.S. National Phase Application under 35 U.S.C. 371 of International Application No. PCT/DE2022/100206, filed on Mar. 17, 2022. The entire disclosure of the above application is incorporated herein by reference.

BACKGROUND

This section provides background information related to the present disclosure which is not necessarily prior art.

TECHNICAL FIELD

The invention relates to a device and a method for extracting one or more constituents, in particular cannabinoids such as tetrahydrocannabinol (THC) from a mixture of substances.

DISCUSSION

In known devices for the extraction of essential oils from plant material, plant material is placed in a chamber or bubble of the device. Water vapor is then fed into the bubble, preferably at a temperature of 180° C., which dissolves the essential oil from the plant material. Such steam distillation processes are usually operated in batch mode. The process is finished when the temperature of the plant material in the bubble has warmed up to the temperature of the water vapor, because then no condensation of the water vapor can take place on the plant material.

A particular disadvantage is that the process is dependent on the load in the chamber, since the plant material can be exposed to the water vapor in different ways depending on the load height and density, and possibly also depending on the chamber dimensions. Plant material lying further to the outside is usually much better exposed to the flow, while inner plant material can be covered by plant material layers lying further to the outside. Thus, both the duration of the process and the amount of essential oil extracted can vary considerably. Likewise, an average residence time of the plant material in the bubble or chamber is difficult to set.

SUMMARY

This section provides a general summary of the disclosure, and is not a comprehensive disclosure of its full scope or all of its features.

Thus, it is one aspect of the present invention to provide a device and a method that provides a more reliable and uniform extraction and in which the residence time can be more accurately adjusted.

The effect of *cannabis* extracts is mainly due to the active ingredient tetrahydrocannabinol (THC). The THC content can vary greatly from *cannabis* plant variety to *cannabis* plant variety. A THC content of more than 30% is possible in certain *cannabis* varieties under optimal conditions. Currently, medical *cannabis* offers THC levels ranging from under 1 to up to 22%, depending on the variety. The THC content of official medical *cannabis* ranges from under 0.05 to 10.2%.

In order to obtain optimal THC extract from the *cannabis* plant, it may be envisaged to determine the THC qualitatively and/or quantitatively during the growth of the hemp plant in order to be able to determine the harvest time precisely. Sensors, in particular at least one infrared sensor, may be used for this purpose. The sensors can be adapted to record relevant biological data of the plant and store it in a database as required.

Moreover, the device and method according to the invention allow batch operation as well as continuous operation.

The device according to the invention for extracting one or more constituents, in particular THC and/or cannabinoids, from a mixture of substances comprises a chamber, a plate accommodated in the chamber, at least one nozzle for feeding the mixture of substances into the chamber, and a static charging unit, wherein the static charging unit is adapted to statically charge the mixture of substances, the plate having a charge opposite to the static charge of the mixture of substances, such that the statically charged mixture of substances, or at least components thereof, adheres or is adherable to the plate.

The static charging unit can be adapted to statically charge the mixture of substances fed into the chamber and/or to be fed into the chamber. The static charging unit can be set up to statically charge the mixture of substances before, during and/or after feeding into the chamber. The statically charged mixture of substances, or at least constituent parts thereof, may adhere to the plate. The plate may be arranged to be brought to a predetermined charge. It may be arranged to bring the charge of the plate to a nominal charge periodically, or at least at predetermined time intervals. The plate may be arranged to reverse its charge.

The mixture of substances may comprise at least one or more of water, water vapor, and/or particles. The particles may be or comprise hemp particles. The components to be extracted may be components of the particles. Water, water vapor, and/or particles may be components of the mixture of substances.

By adhering the mixture of substances and/or components thereof, in particular by adhering the particles, improved overflow, heat transfer and/or mass transfer can be ensured. The mixture of substances, its components and/or particles can be distributed over the entire surface of the plate, so that a large surface area for overflow, heat and/or mass transfer can result. The static charge of the mixture of substances and/or the plate can be selected such that a predetermined layer thickness of mixture of substances can adhere to the plate.

By detaching the mixture of substances and/or components thereof, in particular the particles, from the plate, the mixture of substances can be removed from the chamber and/or an extraction area after extraction has taken place. The detachment of the mixture of substances from the plate can be performed, for example, by reversing the charge of the plate. Alternatively or additionally, the plate may be moved or jogged for detaching. The time of detachment may correspond to a predetermined residence time. The residence time may be selected such that a predetermined amount of extract is obtained, e.g., per amount of mixture of substances. The mixture of substances dissolved from the plate may fall down under the influence of gravity. The stock mixture dissolved from the plate may be discharged from the chamber through a flap and/or a discharge line.

The plate may be arranged opposite the at least one nozzle, so that the mixture of substances supplied through the nozzle may be sprayable toward the plate and/or onto the plate.

The device may include a heating unit that may be adapted to heat the chamber and/or the plate. The heating unit may be arranged to heat the chamber and/or the plate to a temperature of about 80° C. to 120° C. Extract extracted by the heat provided by the heating unit may be arranged to be evaporated or to pass from a liquid phase to a gas phase. The extract may comprise essential oil, in particular hemp essential oil.

The heating unit can have a hot air generator and a hot air blower. Hot air generated by the hot air generator may be provided to be introduced into the chamber by the hot air blower via a hot air supply. The hot air may have a temperature of about 150° C. to 210° C. Other suitable fluids or gases can also be used instead of hot air.

The heating unit may have a heating wire. The heating wire may be arranged on and/or in the chamber and/or the plate. The heating unit may be or comprise a jacket heater or the like.

The device may have a condensate collector disposed in the chamber. The condensate collector may be arranged at a top of the chamber. The condensate collector may be configured to collect condensed extract in the chamber. The condensate collector may be fluidically connected to a condensate conveyor. Provision may be made for condensate collected in the condensate collector to be injected back into the chamber via the nozzles.

The device may include a tank fluidly connected to the chamber for receiving extract formed in the chamber.

The device may have a cooling unit, which may be fluidically arranged between the chamber and the tank. The cooling unit can be set up to liquefy the extract.

The device may include a collection vessel for receiving and/or forming the mixture of substances, wherein the collection vessel may be fluidically connected to the at least one nozzle.

The device may have a collection container heating unit, which may be set up to heat the collection container and/or material mixture received in the collection container. The collection tank heating unit can be set up to heat the collection tank to a temperature of 50° C. to 120° C.

The device may include a grinder that may be connected to the collection container so that material ground by the grinder, preferably hemp particles, may be introduced into the collection container.

The device may comprise a grinding mill heating unit, which may be arranged to heat the grinding mill. The grinding mill heating unit can be set up to heat the grinding mill to a temperature of 40° C. to 300° C.

The grinding mill heating unit can be designed according to the principle of a drum mill or have a drum mill. Drum mills are used for fine to ultra-fine comminution of various raw materials. They may have a substantially horizontally mounted, cylindrical or cylindrical-conical, rotating drum defining a grinding chamber into which the material to be ground is introduced. The grinding chamber may include grinding media that can be externally heated. By rotating the drum, the contents are circulated or overturned, thereby grinding the material to be ground. The grinding media used are mainly balls made of steel or chilled cast iron, as well as steel rods. If larger pieces of the *cannabis* flower material (ground material) take over the function of the grinding media, this is referred to as autogenous grinding. Continuously operating drum mills usually have openings in the center of the end walls through which the flower material is fed into the grinding chamber or the ground pollen is discharged into a reservoir. The inner walls of the grinding chamber are subject to high stresses and are therefore provided with a wear-resistant lining.

The grinder may be received in a grinder chamber, which may include an air inlet and an air outlet, such that air may enter the grinder chamber through the air inlet, pass through the grinder, the grinder chamber, and/or the material ground by the grinder, and exit the air outlet. The air may be or comprise hot air. The air may be or comprise air having a temperature between about 150° C. to 300° C.

The device can have a sieve arranged between the collection container and the grinding mechanism. A mesh size of the sieve can be selected such that only particles with a certain maximum size can pass through the sieve. For example, the sieve can have a mesh size smaller than 500 μm. However, the sieve can also have a grid width smaller than 200 μm and/or smaller than 20 μm. Thus, a maximum size of the particles in the mixture of substances can be predetermined. Due to the relatively small particle size, the extraction can be or become improved.

The screen may be or comprise a vibrating screen. Alternatively or additionally, a shaker can be connected to the screen so that the screen can be vibrated via the shaker.

The mixture of substances may include the substance ground by the grinder, preferably hemp particles. The substance ground by the grinding mill, preferably hemp particles, may be a component of the substance mixture. By the fact that the particles of the substance mixture comprising the components to be extracted are or may be comminuted, an improved extraction may result.

The collection vessel may have an inlet for supplying a fluid, wherein the fluid may comprise the mixture of substances and/or an extractant that may form the mixture of substances with the ground particles in the collection vessel. The extractant may be or comprise water and/or water vapor. The extractant may be a component of the mixture of substances.

The plate can be movably accommodated in the chamber. The plate can be fixed with a suspension. The suspension may comprise a spring element or the like. The suspension may be adapted to allow movement of the plate. The device may include a vibrating device, which may be adapted to vibrate the plate.

The device may have a control unit for controlling a temperature of the chamber and/or the plate, for controlling the feed of the mixture of substances, and/or for controlling the static charging of the mixture of substances and/or the plate. The control unit may be configured to control the extraction process. The control unit may be adapted to control or regulate one, more or all of the controllable parts, such as feed units, valves, heating elements, dampers, mills or the like of the device.

The device may have at least one temperature sensor located on or in the chamber. At least one, more or all of the temperature sensors may be connected to the control unit.

The device may have at least one optical sensor disposed on or in the chamber. The optical sensor may be or comprise a camera. The optical sensor may be connected to the control unit.

According to a further aspect, the invention relates to a method for extracting one or more constituents, in particular THC and/or cannabinoids, from a mixture of substances, comprising the following steps: Feeding a mixture of substances into a chamber of an apparatus for extraction; Statically charging the mixture of substances with a static charge by means of a static charging unit; Adhering the statically charged mixture of substances or at least components thereof to a plate received in the chamber and charged with a charge opposite to the static charge; Releasing the mixture of substances or components thereof adhered to the plate from the plate after a predetermined adherence time has elapsed. The adhesion time may correspond to a dwell time. The adhesion time may be predetermined.

The sequence of several steps can be interchangeable. For example, static charging can be performed before feeding the stock mixture.

Releasing from the plate may include jogging the plate. Alternatively or additionally, release from the plate may include reversing the charge on the plate.

The chamber and/or plate can be heated to a temperature of about 80° C. to 210° C.

An extract formed in the chamber can be exported from the chamber. The formed extract can be cooled and/or liquefied.

The cooled and/or liquefied extract can be separated. For this purpose, for example, a vacuum extraction process can be provided or carried out.

The mixture of substances may be formed in a collection vessel and/or supplied to the chamber from a collection vessel. The mixture of substances may include at least one of particles, water, and/or water vapor. The particles may be or comprise hemp particles.

The particles can be ground by a grinding mill and fed to the collection container. The particles can be ground by the grinding mill in such a way that they can have an average size of less than 500 μm, preferably less than 200 μm, particularly preferably less than 20 μm.

The particles ground by the grinder, in particular hemp particles, can have air flowing through them before being fed to the collection container. Hot air may flow through the particles. Air having a temperature between about 150° C. to 300° C. may flow through the particles. A flow through the particles may include flowing around or over the hemp particles.

The particles ground by the grinder can be screened by a sieve before being fed to the collection container. The particles can be screened by a vibrating screen. Screening can ensure that only particles with a maximum size can be used in the process.

The collecting tank can be heated to a temperature of about 50° C. to 120° C.

The process can be carried out by means of a device described above.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
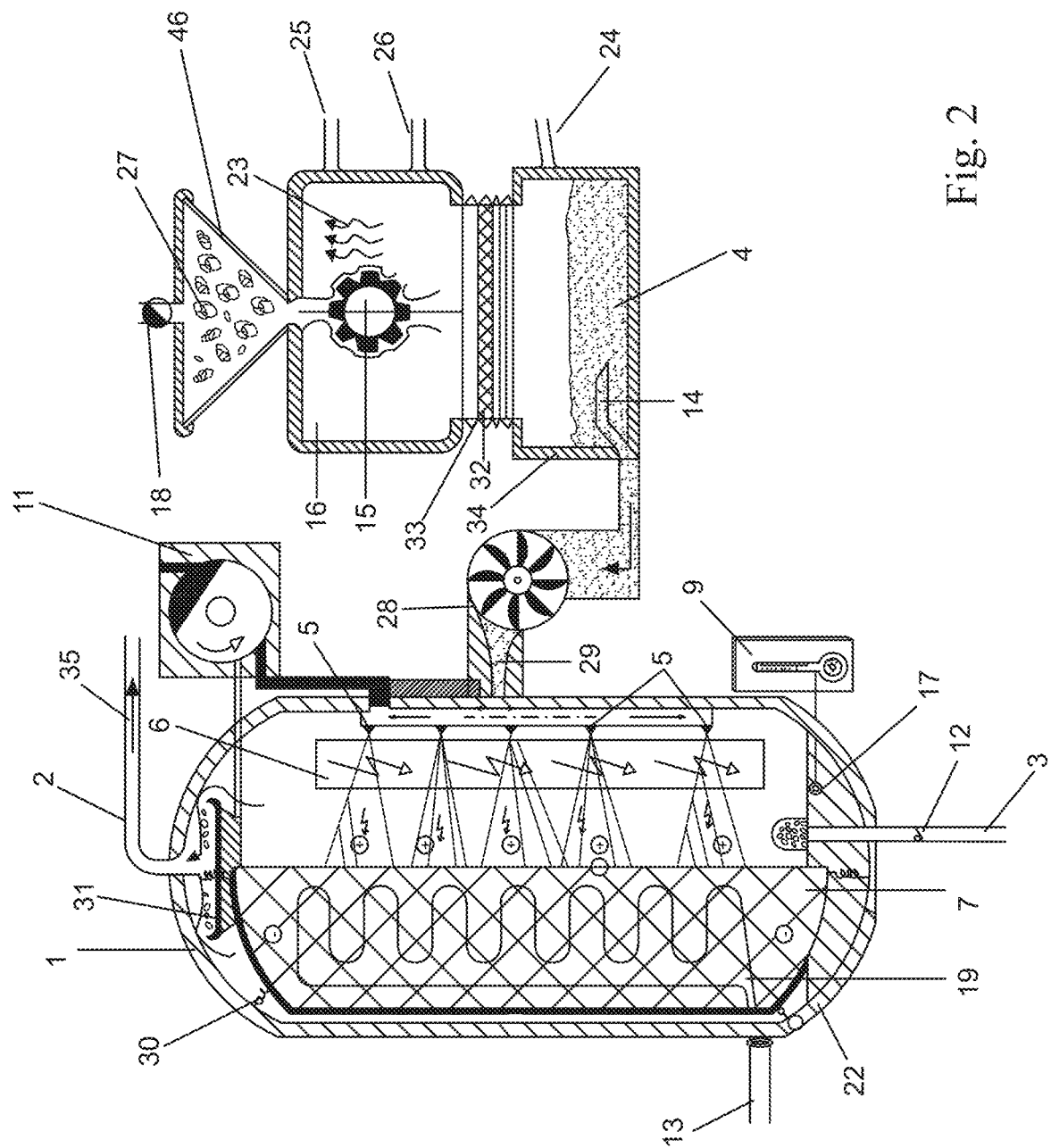
Figure 3:
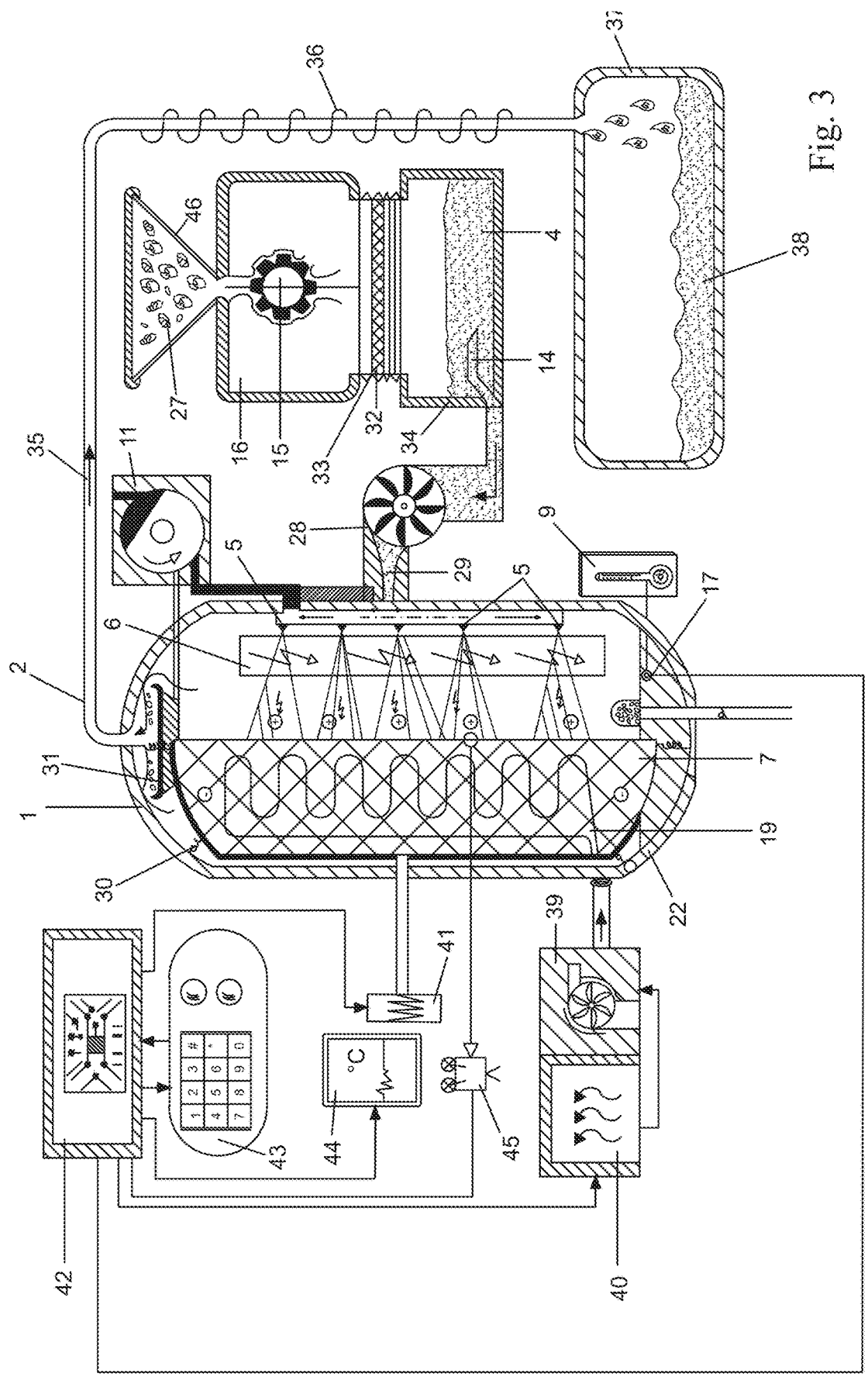

The invention is further explained with reference to the following figures. Thereby show:

FIG. 1 a first embodiment of a device according to the invention;

FIG. 2 a second embodiment of a device according to the invention;

FIG. 3 a third embodiment of a device according to the invention.

DETAILED DESCRIPTION

Example embodiments will now be described more fully with reference to the accompanying drawings.

FIG. 1 shows a first embodiment of a device 1 according to the invention. the device 1 has a chamber 8, a plate 7, at least one nozzle 5 and a static charging unit 6. The plate 7 is arranged in the chamber 8. A mixture of substances 4 can be introduced into the chamber 8 via a feed line 10. The feed line 10 can be fluidically connected to the at least one nozzle 5, so that the substance mixture 4 can be sprayed into the chamber 8.

The chamber 8 and/or the plate 7 can be heated. The device 1 may have a heating unit for this purpose. For example, the heating unit may comprise a heating wire 19. The heating wire 19 may comprise a heating coil and/or heating spiral. For example, the heating wire 19 may be guided through the interior of the plate 7. Alternatively, or additionally, the heating wire 19 may be disposed in or around the chamber 8. Alternatively, or additionally, the heating unit may heat the chamber 8 and/or the plate 7 by means of hot air. For this purpose, the device 1 may comprise a hot air supply 13, by means of which hot air may be introduced into or passed through the chamber 8 and/or the plate 7. The hot air feed 13 may be suitably guided. In an embodiment not shown, the hot air supply duct 13 may, for example, be guided in a serpentine manner through the plate 7. However, it may also be provided that hot air is introduced into the chamber 8 through the hot air supply 13. For example, the heating unit can have a hot air generator 40 and/or a hot air blower 39, cf. FIG. 3. Instead of hot air, another suitable fluid can also be used by means of which the heating unit can heat the chamber 8 and/or the plate 7. Alternatively, or additionally, the heating unit can be or comprise a jacket heater which can heat, for example, an inner wall of the chamber 8.

The heating unit may be arranged to heat the plate 7 and/or the chamber 8 to a temperature of about 80° C. to 120° C. The hot air can have a temperature of about 80° C. to 120° C.

The plate 7 can be arranged in the chamber in such a way that it can be arranged essentially opposite the nozzles 5 and/or lying in the spraying direction. This can result in good distribution of the mixture of substances 4 to be sprayed on the plate 7.

The mixture of substances 4 may comprise water, water vapor and/or particles. In particular, the particles may be or comprise hemp particles. The particles may be or comprise ground or otherwise comminuted particles. The particles may comprise the ingredients to be extracted.

In particular, the particles may comprise THC and/or cannabinoids that can be extracted by means of the device 1 and/or the corresponding process. For example, the particles may comprise $\Delta^9$-THC. Cannabinoids may include, for example, cannabigerol (CBG), cannabichrome (CBC), cannabidiol (CBD), cannabinodiol (CBND), tetrahydrocannabinol (THC), cannabinol (CBN), cannabitriol (CBT), cannabielsoin (CBE), isocannabinoids, cannabicyclol (CBL), cannabicitran (CBT), and/or cannabichromanone (CBCN).

The extraction can be done by evaporation and subsequent condensation. In the chamber 8, the mixture of substances 4 can be heated or kept at temperature. The water and/or water vapor may serve as a solvent for extraction of components contained in the particles. The water vapor may contain at least one solvent. Thus, it is possible to extract the THC or CBD from the flowers. The most commonly used solvents are propane, $CO_2$, isopropyl alcohol, dimethyl ether, ethanol and butane. At the end of the process, these contain the ingredients of the plant, such as the THC or CBD. Depending on the plant species, the concentration of the THC or CBD in the solvent can range from 70% to 99% by volume.

For example, the water vapor may condense on the particles, e.g., if the particles have a lower temperature than the water vapor or are cooler. The condensed water can wet the particles, whereby substances contained in the particles, e.g. essential oils, in particular essential hemp oils, can diffuse out of the particles. This may result in an oil-water mixture. It may be provided that the condensation of the water vapor on the particles takes place before feeding into the chamber 8. The condensation may take place, for example, in a collecting container 34, cf. e.g. FIG. 2. The mixture of substances 4 may comprise or be the oil-water mixture. The oil-water mixture may evaporate when heated. Provision may be made to introduce the oil-water mixture into the chamber through the nozzles 5. This heating may take place in the chamber 8, for example preferably at the plate 7. The mixture of substances 4, in particular the oil-water mixture, can be vaporized in the chamber 8, preferably at the plate 7. During this process, the particles, or at least residual or non-evaporated components of the particles, may remain. The evaporated oil-water mixture, and/or the evaporated mixture of substances 4, can rise upwards under free convection and be exported as extract 35 from the chamber 8 and/or the device 1 via an extraction line 2.

Alternatively, or additionally, however, it can also be provided that the water of the mixture of substances 4 evaporates in the chamber 8, e.g. in particular at the plate 7, and thereby dissolves the substances or constituents from the particles. The extract formed in this way can be exported from the chamber 8 or the device 1 via the extraction line 2.

Alternatively, the mixture of substances 4 supplied to the chamber may comprise the particles but may not comprise a solvent, in particular water and/or water vapor. After feeding the mixture of substances 4 or the particles into the chamber 8, water vapor and/or water can subsequently be fed to the chamber as a solvent. The water and/or water vapor can wet the particles, dissolve the substances from the particles and subsequently be exported as extract 35 from the chamber 8 or the device 1 via the extraction line 2. It may be provided that water vapor may first condense on the particles as described above.

It may also be intended to use a solvent other than water and/or steam.

The extract 35 may comprise the evaporated oil-water mixture and/or the evaporated mixture of substances 4. It may be provided that the extract 35 and/or the vaporized substance mixture 4 does not comprise the residual components of the particles or their non-vaporized components. The residual components of the particles and/or their non-evaporated components may be exported from the chamber 8 and/or the device 1 via a flap 22 and/or an exhaust line 3.

Since the partial vapor pressures of the oil-water mixture can add up, evaporation can already be achieved just below 100° C. Due to the low evaporation temperature, the aroma of the extract 35 or its components can be improved and/or preserved.

It may be provided that the internal pressure of the chamber 8 is substantially equal to atmospheric pressure or approximately 1 bar. It may also be provided that a vacuum or pressure of up to 100 bar is present in the chamber. It may be provided that the temperature inside the chamber 8 and/or the temperature of the plate is between about 80° C. to 120° C.

The static charging unit 6 is arranged to statically charge the mixture of substances 4. The static charging can take place before the stock mixture 4 is fed into the chamber 8, during the feeding into the chamber 8, or after the feeding into the chamber 8. The static charging unit 6 may be arranged accordingly for this purpose. For example, the static charging unit 6 may be arranged in the chamber 8. The static charging unit 6 may positively or negatively charge the mixture of substances 4. The static charging may be an electrostatic charging. For example, the static charging unit 6 may be arranged to generate an electric field through which the mixture of substances 4 may be passed. Alternatively, or additionally, the static charging unit 6 may be arranged fluidically downstream of the nozzle 5 so that the mixture of substances 4 can be sprayed through the static charging unit 6 and/or an electric field generated by the static charging unit 6. When the mixture of substances 4 is passed through and/or sprayed through the electric field, the mixture of substances 4, in particular particles contained in the mixture of substances 4, can be statically charged. The mixture of substances 4, in particular particles contained in the mixture of substances 4, can be statically charged by the static charging unit 6 by means of a field charge.

The plate 7 has a charge opposite to the static charge of the mixture of substances 4. For example, if the mixture of substances 4, e.g. particles thereof, is negatively charged, e.g. by the static charging unit 6, the plate 7 may be positively charged. If the mixture of substances 4 is positively charged, for example, the plate 7 may be negatively charged. Thus, the statically charged mixture of substances 4, e.g., particles of the mixture of substances 4, may adhere to the plate 7, e.g., due to the Coulomb force. The static charge of the mixture of substances 4 and the charge of the plate 7 may be suitably selected for this purpose. For example, the static charging unit 6 and/or the plate 7 may be or be controlled or regulated accordingly. For example, provision may be made to suitably select or control the composition of the mixture of substances 4, in particular the proportions or weight proportions of its components, the particle size, the strength of the electric field and/or the charge of the plate 7.

By adhering the mixture of substances and/or components thereof, in particular by adhering the particles, an improved overflow, heat transfer and/or mass transfer, can be ensured. In particular, this can ensure that the particles comprising the components to be extracted do not collect at the bottom of the chamber 8 but can be evenly distributed on the plate 7. This can result in improved extraction. The static charge of the mixture of substances 4 and/or the plate 7 may be selected or controlled in such a way that a predetermined layer thickness of mixture of substances 4 can adhere to the plate 7. Provision may be made to select the layer thickness as a function of, for example, a predetermined residence time, the adhesion time and/or the heat and mass transfer through the layer or the like.

It may be intended to detach the mixture of substances 4 adhering to the plate 7, and/or particles of the mixture of substances 4, from the plate 7. The loosening may be performed, for example, by shaking or moving the plate 7. Alternatively, or additionally, the charge of the plate may be reversed so that it corresponds to the charge of the mixture of substances 4, whereby the mixture of substances 4 may be detached from the plate 7. If the device is operated in a batch mode, it may be provided to perform the detaching at a predetermined time after the spraying of the mixture of substances 4. If the device is operated continuously, it may be provided to perform the dissolving periodically. The time and/or the period duration and/or the adhesion time can be selected in such a way that this corresponds to a predetermined residence time. The residence time and/or the adhesion time can be selected such that a predetermined proportion of extract, e.g. per amount of stock mixture, is obtained. The mixture of substances dissolved from the plate may fall down under the influence of gravity. The stock mixture dissolved from the plate can be discharged from the chamber through a flap and/or a discharge line.

The residence time and/or the adhesion time may depend on or be selected according to the particle size, the temperature of plate 7 and/or chamber 8, the amount of solvent or the proportions by quantity or weight of the components of the mixture of substances and/or the constituents to be extracted.

The plate 7 may be movably arranged with a suspension 30, so that the plate 7 may be shaken to loosen substance mixture 4, and/or particles, adhering thereto. For example, the plate 7 may be attached via the suspension 30, for example with an inner side of the chamber 8. However, it may also be provided that the suspension and/or the attachment of the plate is not arranged in the chamber 8, in particular cannot come into contact with substance mixture 4 and/or is not fluidically connected to the chamber 8.

The device 1 can have a flap 22 by means of which substance mixture 4 fed into the chamber 8 and/or substance mixture 4 detached from the plate 7, in particular particles thereof, can be discharged from the device 1 and/or the chamber 8. Alternatively or additionally, the device 1 may have a discharge line 3 through which substance mixture 4 can be discharged from the chamber 8. A valve 12 can be arranged in the discharge line 3, by means of which the discharge line 3 can be opened and/or closed. The valve 12 can be connected to a control unit so that the valve 12 can be controlled, in particular opened or closed.

The device 1 may include a condensate collector 31. The condensate collector 31 may be adapted to collect condensate formed in the chamber 8. The condensate collector 31 may be arranged at an upper side of the chamber 8. Condensate formed at the top of the chamber 8 may be arranged to be trapped or collected by the condensate collector 31. The condensate collector 31 may be fluidly connected to a condensate conveyor 11. The condensate conveyor 11 may be or include a pump. The condensate conveyor 11 may be configured to transport away condensate collected in the condensate collector 31. For example, the condensate collected by the condensate collector 31 may be exported from the device 1. Alternatively or additionally, the collected condensate can be mixed with the stock mixture 4 and/or reintroduced into the chamber 8 of the device 1.

The condensate can be filled into capsules inside the device. The capsules can be inserted into a tube-like magazine in a vaporizer. The capsules can be heated separately so that the condensate (active ingredient) can be administered in portions. Fresh air can be added to the aerosol when the heating unit is activated and inhaled. Another embodiment of the invention provides that the described device or parts thereof are incorporated in a vaporizer or inhaler. By oral consumption or by vaporization of the produced condensate in a vaporizer, exposure of the respiratory tract is omitted by avoiding carcinogenic substances produced during combustion. Combustion does not take place in the new process.

The device 1 may include at least one temperature sensor 17 capable of measuring a temperature of the chamber 8 and/or the plate 7. At least one temperature sensor 17 may be arranged in or on the chamber 8 and/or the plate 7. It may be provided that temperature sensors 17 are arranged vertically in the height direction of the chamber 8. The temperature sensor 17 may be connected to the control unit so that the control unit can detect temperature values measured by the temperature sensor 17.

FIG. 2 shows a further embodiment of a device according to the invention. The embodiment shown in FIG. 2 may have some, several or all of the features shown in FIG. 1 and/or described above.

The device 1 can have a collection container 34. The collection container 34 can be fluidically connected to the nozzle 5 via the feed line 10. Material mixture 4 can be or is received in the collection container 34. The collection container 34 may have an outlet 14 through which the mixture of substances 4 may enter the supply line 10 from the collection container 34. A conveying unit 28 may convey the mixture of substances 4 from the collection container 34 to the at least one nozzle 5. The delivery unit 28 may be or comprise a pump, for example. The feed line 10 may comprise a venturi nozzle 29. The collection container 34 may have an inlet 24 through which stock mixture 4 and/or components of the stock mixture 4, in particular water and/or water vapor, may be introduced into the collection container 34.

The device 1 may have a collection container heating unit (not shown in the figures). The collecting container heating unit may be arranged to heat the collecting container to a temperature of about 50° C. to 120° C. The collecting container heating unit may be or comprise, for example, a hot wire and/or a jacket heater.

The device 1 may comprise a grinding mill 15. The grinding mill 15 may be arranged in a grinding mill chamber 16. Material received in a container 46 to be ground may be fed to the grinding mill 15 and ground into particles by the grinding mill 15. It may be provided that the ground particles have an average particle size and/or average particle diameter of less than 500 μm. It may be provided that the ground particles have an average particle size and/or average particle diameter of less than 200 μm. It may be provided that the ground particles have an average particle size and/or average particle diameter of less than 20 μm. The material 27 to be ground may be or comprise hemp, in particular hemp flowers or hemp leaves. The ground particles may be or comprise hemp particles.

The device 1 may have a grinder heating unit. The grinding mill heating unit may heat the grinding mill 15 to a temperature between about 40° C. and 300° C. The grinding mill heating unit may be housed in and/or thermally connected to the grinding mill. Heating of the grinding mill may be accomplished, for example, by a hot wire in or on the grinding mill and/or by thermal conduction. Alternatively or additionally, heating of the grinding mill may be by convection using hot air. By heating the grinding mill, the ground material may be or become preheated, for example.

The grinder chamber 16 may include an air inlet 26 and an air outlet 25. The air outlet 25 may be disposed above the air inlet 26. However, it may also be provided that the air inlet 26 is disposed above the air outlet 25. Air 23 may be introduced into the grinder chamber 16 through the air inlet 26. The introduced air 23 may be hot air. The introduced air 23 may have a temperature between about 150° C. to 300° C. The introduced air 23 may flow through and/or over the grinder chamber 16, the grinder 15, and/or the ground particles such that the air 23 may dissolve components, particularly TCH and/or cannabinoids, from the ground particles. The air 23 may form an aerosol with the dissolved components. The air 23, dissolved components and/or aerosol may be exported from the grinding mill chamber 16 via the air outlet 25. Provision may also be made to select or use another suitable fluid or gas in place of or in addition to air.

The container 46 may be disposed above the grinder chamber 16 so that the material 27 to be ground may be fed to the grinder 15 under the influence of gravity. The container 46 may include an access through which material 27 to be ground may be introduced into the container 46. Provision may be made to open or close the access via a flap 18. The flap 18 may be connected to and controlled by the control unit. The grinding chamber 16 may be arranged above the collection container 34, so that the ground particles can be fed to the collection container under the influence of gravity.

It may be provided that the mixture of substances 4 is formed in the collection container 34. For example, the ground particles may be fed from the grinding chamber 16 to the collection container 34. For example, the ground particles may form the mixture of substances 4 in the collection container 34 with fluid introduced via the inlet 24, in particular water and/or water vapor. Alternatively, however, it may also be provided that already formed stock mixture 4 is introduced into the collecting container 34 via the inlet.

A sieve 32 can be arranged between the grinding chamber 16 and the collection container 34. This can ensure that only ground particles with a predetermined maximum particle size or diameter can be introduced into the collection container 34. The formed mixture of substances 4 can thus have particles with a predetermined maximum particle size or diameter. The sieve 32 may be arranged to pass only particles with a maximum particle size or maximum diameter of less than 500 μm. The sieve 32 may be configured to pass only particles having a maximum particle size or maximum diameter of less than 200 μm. The sieve 32 may be arranged to pass only particles with a maximum particle size or maximum diameter smaller than 20 μm. For example, the sieve can have corresponding mesh sizes. The sieve 32 may be or comprise vibrating sieve. Alternatively, or additionally, a shaker 33 may be connected to the sieve 32 or the sieve 32 may comprise one. The shaker 33 may be arranged to move and/or vibrate the screen 32. It may be provided that the vibrating screen and/or the shaker 33 may be connected to and/or controlled by the control unit.

FIG. 3 shows a further embodiment of a device according to the invention. The embodiment shown in FIG. 3 may have some, several or all of the features shown in FIG. 1 and/or FIG. 2 and/or described above.

The device 1 may comprise a tank 37. The tank 37 may be fluidically connected to the chamber 8. The extract 35 discharged from the chamber 8 may be supplied to the tank 38 via the discharge line 2. It may be provided that a cooling unit 36 is fluidically arranged between chamber 8 and tank 37. The cooling unit 36 may, for example, be or comprise a water cooling system. The cooling unit 36 may be or comprise a serpentine cooler and/or a tubular cooler. The cooling unit 36 may be arranged to cool, condense and/or liquefy the gaseous and/or vaporized extract 35. The liquefied extract 38 may be collected and/or received in the tank 37.

In the tank 37, the solvent, particularly the water, may separate from the essential oil due to differences in specific gravity or density. The lighter essential oil may float above the heavier water. Provision may be made to allow the essential oil to drain through a suitably arranged drain of the tank 37. Alternatively or additionally, the essential oil may be extracted. Alternatively or additionally, it may be provided to separate the liquid extract 38 by means of a downstream separation process (not shown in the figures), for example a vacuum distillation, or to separate the essential oil from the extract.

The device 1 may comprise a vibrating unit or shaker 41. The vibrating unit 41 may be connected to the plate 7 and/or move or vibrate the plate 7. The vibrating unit 41 may be arranged to shake or move the plate 7 in such a way that substance mixture 4 or particles adhering to the plate 7 are detached from the plate 7.

The device 1 may include at least one optical sensor 45. The optical sensor 45 may be or may comprise a camera. The camera may be or comprise a thermal imaging camera. The optical sensor 45 may be arranged on or in the chamber 8. The optical sensor 45 may also be disposed on an exterior of the chamber 8. The device 1 and/or the chamber 8 may include a window through which the optical sensor 45 may look into the chamber 8 or capture an image or video of the interior of the chamber 8.

The device 1 may have a display 44. The display 44 may be configured to indicate operating conditions of the device 1. For example, the display 44 may indicate one or more temperatures inside the chamber, a feed rate of the stock mixture 4, one or more internal pressures of the chamber 8, a fill level of the container 46, operating parameters of the static charging unit 6, the grinder 15, the conveyor unit 28 and/or the condensate conveyor 11, the vibrating unit 41, the shaker 33, or the like. The display may be adapted to display images captured by the optical sensor 45. The device 1 may include a thermometer 9, which may be integrated with and/or different from the display 44.

The device 1 can have an operating unit 43. It may be provided that the operating unit 43 is integrated into the display 44. For example, the display 44 may be or comprise a touch-sensitive display. However, it may also be provided that the operating unit 43 is different from the display 44. The operating unit can be used, for example, to enter or change operating parameters of the device 1 or of the process.

The device 1 may comprise a control unit 42. The control unit 42 may be arranged to control the temperature of the chamber 8 and/or the plate 7, the feeding of the stock mixture 4 and/or the static charging by the static charging unit 6. The control unit 42 may be arranged to control the heating unit, the conveying unit 28, the condensate conveyor 11, the grinding unit 15, the shaking screen or shaker 33 and/or the vibrating unit 41. The control unit 42 may have appropriate connections for this purpose. The control unit 42 may be connected to and/or control one or more of the heating unit, the condensate conveyor 11, the conveyor unit 28, the shaking screen or shaker 33, the vibrating unit 41 the grinding unit 15, the valve 12, the flap 22, the flap 18, the cooling unit 36, the temperature sensor 17, the optical sensor 45, the operating unit 43 and/or the display 44 and/or be in communication and/or exchange.

The features disclosed in the figures, claims and description may individually or in combination be essential to the implementation of the invention.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A device for the extraction of one or more cannabinoids from a mixture of substances, the device comprising a chamber, a plate accommodated in the chamber, at least one nozzle for feeding the mixture of substances into the chamber and a static charging unit, wherein the static charging unit is arranged to statically charge the mixture of substances, wherein the plate has a charge opposite to the static charge of the mixture of substances, so that the statically charged mixture of substances, or at least components thereof, adheres or is adherable to the plate, a collection container, wherein the collection container is fluidically connected to the at least one nozzle, a grinder connected to the collection container so that material ground by the grinder can be introduced into the collection container, and a grinding mill heating unit adapted to heat the grinding mill.

2. The device according to claim 1, wherein the mixture of substances comprises at least one or more of water, water vapor and/or particles.

3. The device according to claim 1, in which the plate is arranged opposite the at least one nozzle, so that the mixture of substances supplied through the nozzle can be sprayed in the direction of the plate and/or onto the plate.

4. The device according to claim 1, comprising a heating unit adapted to heat the chamber and/or the plate to a temperature between about 150° C. to 220° C., wherein the heating unit is adapted to heat metal balls arranged in a grinding chamber of a grinding mill heating unit.

5. The device of claim 4, wherein the heating unit comprises a hot air generator and a hot air blower.

6. The device according to claim 4, wherein the heating unit comprises a heating wire arranged on and/or in the chamber and/or the plate.

7. The device according to claim 1, comprising a condensate collector arranged in the chamber, wherein the condensate collector is arranged on an upper side of the chamber.

8. The device according to claim 1, comprising a tank fluidly connected to the chamber for receiving extract formed in the chamber.

9. The device of claim 8, comprising a cooling unit fluidically disposed between the chamber and the tank.

10. The device according to claim 1, comprising a collection container heating unit adapted to heat the collection container and/or material mixture received in the collection container.

11. The device according to claim 1, wherein the grinder is accommodated in a grinder chamber having an air inlet and an air outlet so that air having a temperature between about 150° C. to 300° C., can flow into the grinder chamber through the air inlet, flow through the grinder, the grinder chamber and/or the material ground by the grinder, and flow out of the air outlet.

12. The device according to claim 1, comprising a screen arranged between the collection container and the grinding mechanism, wherein preferably the screen has a mesh size smaller than 500 μm.

13. The device of claim 12, wherein the screen is or comprises a vibrating screen.

14. The device according to claim 1, wherein the mixture of substances comprises the substance ground by the grinder.

15. The device according to claim 1, wherein the collection container has an inlet for supplying a fluid, the fluid comprising the mixture of substances and/or an extraction agent which forms the mixture of substances with the ground particles in the collection container.

16. The device according claim 1, wherein the plate is movably received in the chamber and comprises a vibrating unit adapted to vibrate the plate.

17. The device according to claim 1, comprising a control unit for controlling a temperature of the chamber and/or the plate, for controlling the supply of the mixture of substances and/or for controlling the static charging of the mixture of substances and/or the plate.

18. The device according to claim 1, comprising at least one temperature sensor arranged on or in the chamber and connected to the control unit.

19. The device according to claim 1, comprising at least one optical sensor arranged on or in the chamber, which is preferably connected to the control unit.

* * * * *